United States Patent [19]

Dang et al.

[11] Patent Number: 5,508,376
[45] Date of Patent: Apr. 16, 1996

[54] ALCOHOL SOLUBLE RIGID-ROD BENZOBISAZOLE POLYMERS

[75] Inventors: Thuy D. Dang, Centerville; Jom P. Chen, Hilliard; Fred E. Arnold, Centerville, all of Ohio

[73] Assignee: The United States of America as represented by the Secretary of the Air Force, Washington, D.C.

[21] Appl. No.: 393,589

[22] Filed: Feb. 21, 1995

[51] Int. Cl.⁶ ............................................. C08G 75/32
[52] U.S. Cl. ..................... 528/328; 528/342; 528/348; 528/352; 528/356; 528/357; 528/480; 528/487; 528/488
[58] Field of Search ........................ 528/328, 327, 528/342, 348, 352, 356, 357, 480, 487, 488

[56] References Cited

U.S. PATENT DOCUMENTS

| | | | |
|---|---|---|---|
| 4,900,805 | 2/1990 | Arnold et al. | 528/337 |
| 4,900,806 | 2/1990 | Arnold et al. | 528/337 |
| 5,086,120 | 2/1992 | Tan et al. | 525/183 |
| 5,312,895 | 5/1994 | Dang et al. | 528/337 |
| 5,316,695 | 5/1994 | Wilkes et al. | 252/315.6 |
| 5,344,896 | 9/1994 | Dang et al. | 525/435 |

*Primary Examiner*—Shrive Beck
*Assistant Examiner*—Erma Cameron
*Attorney, Agent, or Firm*—Charles E. Bricker; Thomas L. Kundert

[57] ABSTRACT

Alcohol-soluble aromatic heterocyclic polymers and copolymers having repeating units of the formulae I or II:

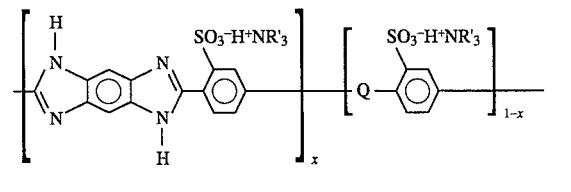

or

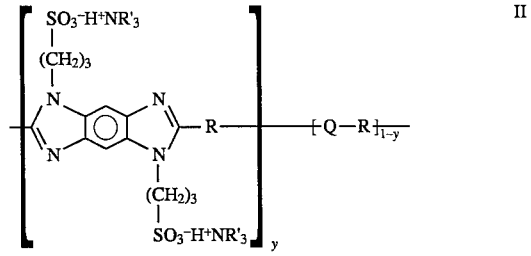

wherein Q is a benzobisazole of the formula:

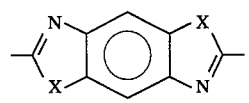

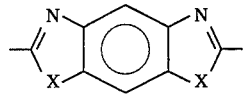

wherein X is —O— or —S—; wherein x has a value of 0.0 to 1.00 and y has a value of 0.05 to 1.00, and R is selected from the group consisting of:

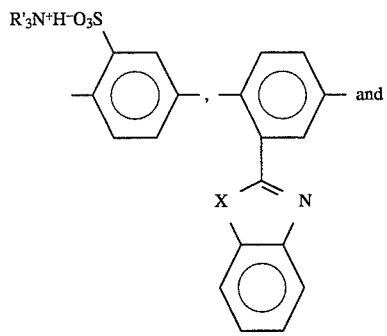

and

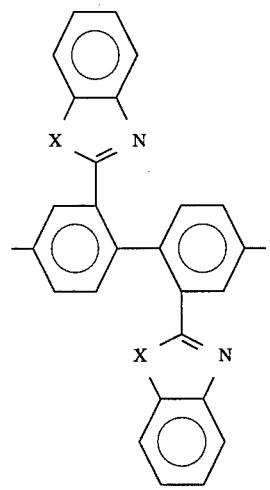

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups. The alcohol-soluble polymers and copolymers may be used for fabricating organic/inorganic hybrid composites with metal alkoxides $M(OZ)_v$, wherein M is Si, Ti, Al or the like and Z is a lower alkyl group. These polymers and copolymers can also be used to coat materials or substrates which are susceptible to attack by highly corrosive acids. On drying, the ionic bond between the trialkylamine and the sulfo group is broken and the (co)polymer reverts to the parent structure, thereby leaving a (co)polymer coating. Yet further, the original amine can be exchanged with a less volatile amine or an amine having a desired functionality. After removal of the solvent, the resulting material is mono-dispersed and stable.

7 Claims, No Drawings

ALCOHOL SOLUBLE RIGID-ROD BENZOBISAZOLE POLYMERS

RIGHTS OF THE GOVERNMENT

The invention described herein may be manufactured and used by or for the Government of the United States for all governmental purposes without the payment of any royalty.

BACKGROUND OF THE INVENTION

The present invention is directed to heterocyclic copolymers, particularly benzoxazole and benzothiazole polymer systems which are soluble in lower alkyl alcohols.

Sol-gel processing of ceramics and glass is an area of intense research interest because of inherent advantages compared to more conventional processing. By starting with well mixed solutions or sols, chemical homogeneity even on the molecular scale can be obtained.

A great variety of metal alkoxides are commercially available. Still others have been synthesized for specific uses. The alkoxides are utilized by first partially hydrolyzing the alkoxide,

where Z represents a lower alkyl group and M represents Si, Ti, Al and the like, as well as mixtures thereof. The partially hydrolyzed species are then allowed to link forming M-O-M bonds by a polymerization or condensation reaction.

The majority of work done on sol-gel of polymerized alkoxides has been done for glasses. Much of this centers around $SiO_2$ glasses or high $SiO_2$ glasses. The growing use of optical fibers for transmission of information at high rates has provided an incentive to seek fabrication methods for optical grade $SiO_2$ glass which is less expensive than vapor phase methods. Further, silicon alkoxides exist which are inexpensive, highly pure and easily polymerized to gels. The most common of these is tetraethylorthosilicate (TEOS), $Si(C_2H_5O)_4$, the ethoxide of silicon. When an alcohol (e.g., ethanol) is used as a mutual solvent, TEOS can be mixed with water. This mixture is slow to hydrolyze, but the rate can be increased by additions of acids or bases as catalysts. Acid catalyzed gels form transparent gels which appear to be rather uniform polymers. Base catalyzed gels are not as transparent and are thought to contain $SiO_2$ clusters which then link together to form a gel.

In the case of TEOS, the mechanism for gel formation is polymerization after partial hydrolysis of $Si(C_2H_5O)_4$ to have both ethyl groups and hydroxide groups attached to the Si:

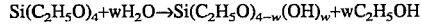

Reaction of an OH group on one Si with a $C_2H_5O$ group on another releases another alcohol molecule and forms a siloxane bond, Si-O-Si, at all temperatures close to ambient. These siloxane bonds form the basis for the polymerization and thus the gelation.

Such gels contain large amounts of water and alcohol, leaving a low density of $SiO_2$. Drying such gels results in large shrinkages as liquid-filled pores partially collapse. Since the liquid content of the gel is large and the pores are small, liquid transport is slow and rapid drying leads to large shrinkages near the gel body surfaces. Because the mechanical strength of the gel is low, these non-uniform shrinkages lead to cracking.

Several studies have demonstrated the successful incorporation of various functionalized oligomers into a sol-gel network to produce novel organic/hybrid materials referred to as 'ceramers'. Such studies have involved, for example, a sol-gel reaction using tetramethylorthosilicate (TMOS) or TEOS and silanol-terminated poly(dimethylsiloxane). Other systems investigated were hybrids based upon TEOS or TMOS, or related metal alkoxides, reacted with an oligomer of poly(tetramethylene oxide) endcapped with isocyanatopropyltriethoxysilane. Wilkes et al, U.S. Pat. No. 5,3 16,695, disclose the use of a polymeric catalyst, such as poly(styrenesulfonic acid), in such a system.

Organic/inorganic hybrid materials prepared through sol-gel processing have the potential to possess the desired properties of both organic and inorganic components, such as high tensile modulus, scratch resistance, thermal and dimensional stability from the inorganic network, as well as toughness, flexibility and light weight from the organic portion. A variety of high performance, thermally stable polymeric structures are known, but they are intractable and virtually impossible to process. Aromatic heterocyclic polymers are the most attractive high temperature, high performance polymer systems. Although these polymers have excellent high temperature properties, they exhibit solubility only in high boiling aprotic or acidic solvents.

One group of polymers of particular interest are the para-ordered heterocyclic polymers. This group, commonly referred to as rigid-rod or rigid-chain polymers, has repeating units of the general formula —(-Z-Ar-)—, wherein Z is benzobisazole group and Ar is a para-oriented aromatic moiety, such as 1,4-phenylene, 4,4'-biphenylene, or the like. Thus, the group includes poly(pphenylene benzobisoxazole)(PBO), poly(p-phenylene benzibisthiazole)(PBT) and poly(p-phenylene benzobisimidazole) (PBI) polymers and copolymers, as well as substituted derivatives thereof. These polymers also have application in nonlinear optical applications because of the combination of their typical polymer properties with their unique electronic and optical characteristics. Their π-electron delocalization can lead to large optical nonlinearities and their femtosecond response time is by far the fastest compared to inorganic materials and multiple quantum wells.

Accordingly, it is an object of the present invention to provide aromatic heterocyclic polymers having improved solubility properties.

It is another object of the present invention to provide aromatic heterocyclic polymers having functionality for co-reaction with metal alkoxides for preparing ceramers.

Other objects and advantages of the present invention will be apparent to those skilled in the art.

SUMMARY OF THE INVENTION

In accordance with the present invention there are provided aromatic heterocyclic polymers and copolymers which are soluble in lower alkyl alcohols. These alcohol-soluble polymers and copolymers have repeating units of the formulae I or II, below:

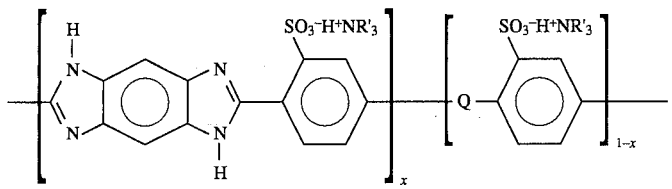

wherein x has a value of 0.0 to 1.00 and Q is a benzobisazole of the formula:

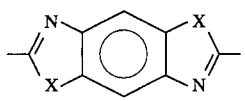

or

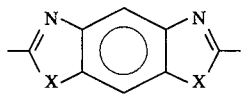

wherein X is —O— or —S—; and

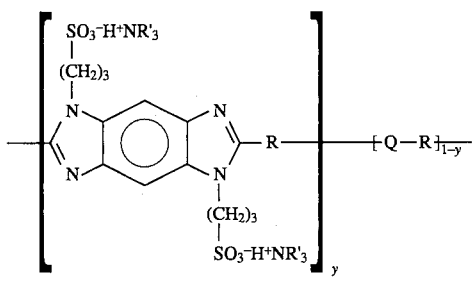

wherein y has a value of 0.05 to 1.00, Q is as described above, and R is selected from the group consisting of:

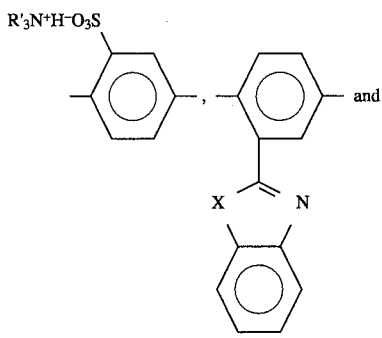

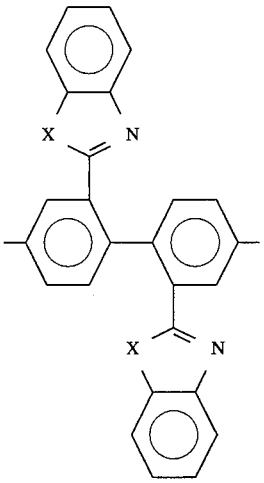

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl, phenylethynyl, and the like. Examples of suitable alkyl groups include methyl, ethyl, butyl and the like; suitable alkaryl and aralkyl groups include benzyl, tolyl, and the like; suitable substituted aromatic groups include nitroaniline, ethynylaniline, phenylethynylaniline and the like.

These polymers and copolymers are formed by the reaction of the corresponding sulfo-pendant (co)polymer with an amine $NR'_3$, wherein R' is as defined previously, in a lower alkyl alcohol, such as methanol, ethanol or the like, at a temperature between ambient and the boiling point of the alcohol or the trialkyl amine, whichever is limiting, until a clear homogeneous solution is obtained, genes:ally about 4 to 48 hours. Exemplary amines, $NR'_3$, include, but are not limited to triethylamine, tributylamine, (N,N-diethyl-3-aminopropyl)trimethoxysilane, and N-(3-triethoxysilyl)propyl)-4,5-dihydroimidazole.

The alcohol-soluble polymers and copolymers of this invention may be used for fabricating the organic/inorganic hybrid composites discussed previously. These polymers and copolymers can also be used to coat materials or substrates which are susceptible to attack by highly corrosive acids. For coating a substrate with the corresponding sulfo-pendant (co)polymer, the amine $NR'_3$ should be a relatively volatile mine, such as triethylamine, in which case an alcoholic solution of the alcohol-soluble (co)polymer is coated onto a substrate. On drying, the ionic bond between the trialkylamine and the sulfo group is broken and the (co)polymer reverts to the parent structure, thereby leaving a (co)polymer coating. If the substrate material and the (co)polymer are not adhering, the coating can be peeled off the substrate, thus providing a film of (co)polymer.

It is also within the scope of the present invention to exchange the original amine with a less volatile amine or an amine having a desired functionality. For example, one of the aforementioned (co)polymers can be reacted with a volatile amine, for example a lower alkyl amine, such as triethylamine, to make the (co)polymer soluble in an alcohol such as methanol or ethanol, after which the volatile amine can be exchanged with a less volatile amine or an amine having a desired functionality, for example, an amine NR"$_3$ wherein R" is defined as R'. As used herein and in the claims, the term volatile is intended to mean having a normal boiling point of about 150° C. or below. Thus, a less volatile amine will have a higher boiling point. As one example, nitroaniline is a known chromophore, but may be difficult to disperse uniformly through a rigid-rod substrate. The functionality of nitroaniline can be uniformly dispersed through such a substrate by (1) reacting a rigicl-rod (co)polymer containing pendant sulfo groups with a volatile amine such as triethylamine in a suitable alcohol solvent, (2) exchanging N,N-dimethyl-4-nitroaniline with the triethylamine and removing the volatile triethylamine and (3) removing the alcohol solvent. The resulting material is mono-dispersed and stable. Prior to removing the solvent, the material can be coated onto a suitable substrate or placed in a mold to provide a molded article. As previously discussed, if the substrate material and the (co)polymer are not adhering, the coating can be peeled off the substrate, thus providing a film of mono-dispersed (co)polymer.

The sulfo-pendant polymers and copolymers corresponding to formula I, i.e.:

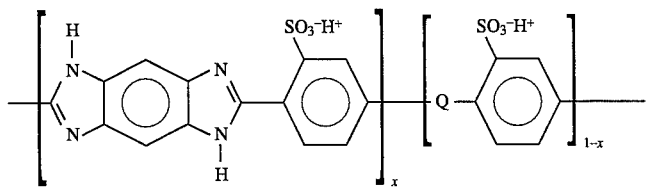

can be prepared as disclosed in Dang et al, U.S. Pat. No. 5,3 12,895, issued May 17, 1994.

The sulfo-pendant polymers and copolymers corresponding to formula II, i.e.:

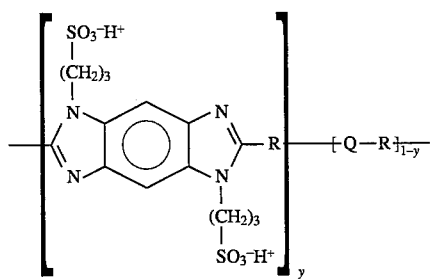

can be prepared as disclosed in Dang et al, U.S. Pat. No. 5,344,896, issued Sep. 6, 1994, in which case, R is defined as

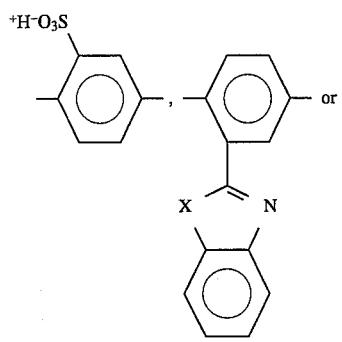

-continued

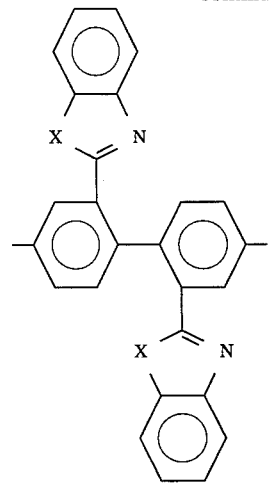

wherein X is as defined above.

Briefly, the polycondensation process comprises the following steps: (i) dehydrochlorination of the diamino-diol (or dithiol) dihydrochloride or the tetraamino tetrahydrochloride in the presence of the dicarboxylic acid monomer in polyphosphoric acid (PPA); (ii) addition of $P_2O_5$ to raise the $P_2O_5$ content of the medium to 82–84%; (iii) chain propagation and cyclodehydration; and (iv) precipitation of the polymer into water, followed by washing and drying the polymer. Step iii may be carried out at a temperature of about 160° to 190° C. for about 4 to 64 hours. It is generally preferred to carry out the polymerization in step-wise fashion, for example, heat to 165° C. over a period of 2–4 hours, 165° C. for 16 hours, then 172° C. for 48 hours.

The organic/inorganic hybrid materials can be prepared by a number of different methods including, for example, the combination of the alcohol-soluble polymers of this invention with TMOS, as illustrated hereinafter. The ratio, by weight, of organic polymer to the metal alkoxide can range from 1:9 to 9:1.

Generally, there is initially prepared a solution of the alcohol-soluble polymer in a lower alkyl alcohol, such as methanol, at a concentration of about 1 to 10 percent (weight/volume), preferably about 6–8 percent. To this solution is added a measured amount of water and the metal alkoxide at a mole ratio (water:metal alkoxide) of 3.0:1 to 3.5: 1. The resulting mixture is stirred until an homogeneous solution is obtained. Coupling or crosslinking between the organic and inorganic polymers is promoted by the addition of a coupling agent to this mixture. Suitable coupling agents contain groups which can react with both the organic polymer and the inorganic polymer, for example, (N,N-diethyl-3-aminopropyl)trimethoxysilane, N-(3-triethoxysilyl)-propyl)-4,5-dihydroimidazole, gamma-aminopropyltrimethoxysilane, gamma-aminopropyltriethoxysilane and the like. The coupling agent is used in an amount of about 1 to 15 mol %, preferably about 5 to 10 mol %, based on the inorganic polymer-forming compound.

Thereafter, the resulting semigel, in one embodiment of the invention, can be formed into a thin film by known methods, such as vacuum evaporation, or applied to a supporting substrate. If phase separation occurs, as indicated by opacity, the material can be made transparent by thermal treatment at about 60°–100° C. for about 10 minutes to 2 hours. Alternatively, it can be cast into a suitable mold, dried slowly over a period of 8 to 200 hours at room temperature, then dried under vacuum for 8 to 48 hours at 80°–100° C.

The following examples illustrate the invention:

EXAMPLE I

Formation of the Ammonium Salt of Poly(1,7-dihydrobenzo(1,2-d:4,5-d)diimidazo-2,6-diyl(2-(2-sulfo)-p-phenylene))

Into a 50 ml, single neck, round-bottom flask equipped with a stirring bar, condenser and nitrogen inlet and outlet, were placed 0.01 g (0.032 mmol) of poly( 1,7-dihydrobenzo(1,2-d:4,5-d)diimidazo-2,6-diyl(2-(2-sulfo)-p-phenylene)), 0.023 g (0.023 mmol) of triethylamine and 6.0 g of methanol. The mixture was heated at 50° C. under a nitrogen atmosphere for 16 hours. The resulting clear, yellow solution was cooled to room temperature, maintaining its homogeneity.

EXAMPLE II

Ion Exchange of N,N-dimethyl-4-nitroaniline for Triethylamine

To the solution of Example I was added 0.005 g (0.032 mmol) of N,N-dimethyl-4-nitroaniline. The mixture was heated to 50° C. with stirring to expel the triethylamine. Fresh methanol was added to the mixture periodically to keep the polymer solution from going to dryness. The solution color gradually changed to red. The solution was tested for completion of triethylamine removal using pH paper. The red, viscous solution was then poured into a film casting disk and placed under reduced pressure to remove the methanol.

EXAMPLE III

Preparation of Organic/Inorganic Hybrid Material I

To a mixture of 0.1 g (0.032 mmol) of poly( 1,7-dihydrobenzo(1,2-d:4,5-d)diimidazo-2,6-diyl (2-(2-sulfo)-p-phenylene)) and 0.053 ml (0.192 mmol) of N-(3-triethoxysilyl)-4,5-dihydroimidazole in methanol solvent was added 0.4 ml of tetramethoxysilane. A clear orange solution was obtained after stirring the mixture for about 5 minutes. To the solution was added 0.1 ml of water. A clear orange homogeneous gel was obtained after mixing for 2 minutes. Removal of the solvent by evaporation provided a xerogel film and removal by super critical drying provided an aerogel foam.

EXAMPLE IV

Preparation of Organic/Inorganic Hybrid Material II

In a resin flask equipped with a mechanical stirrer, condenser and nitrogen inlet/outlet, were placed 0.20 g (0.58 mmol) of poly(benzo(1,2-d:5,4-d') bisthiazole-2,6-diyl(2-(2-sulfo)-p-phenylene)), 35 ml of methanol and 0.14 ml (0.59 mmol) of tributylamine. The mixture was heated at 50° C. for 36 hours under a nitrogen atmosphere. After a clear homogeneous solution was obtained, it was cooled to room temperature, and a silane coupling agent, (N,N-diethyl-3-amino-propyl)trimethoxysilane (0.14 ml, 0.60 mmol) and 0.25 ml trimethoxysilane were added. The mixture was stirred for 2 hours at room temperature and was allowed to absorb atmospheric moisture. A semi-solid wet gel was obtained which on further drying provided a xerogel film with a composition of 50% polymer and 50% silica.

Various modifications may be made in the instant invention without departing from the spirit and scope of the appended claims.

We claim:

1. An alcohol-soluble, aromatic heterocyclic rigid-rod polymer having repeating units of the formulae:

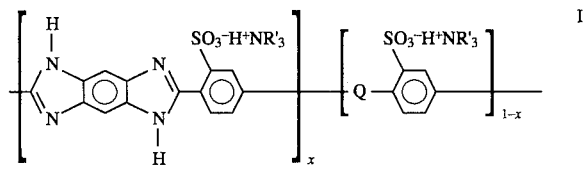

or

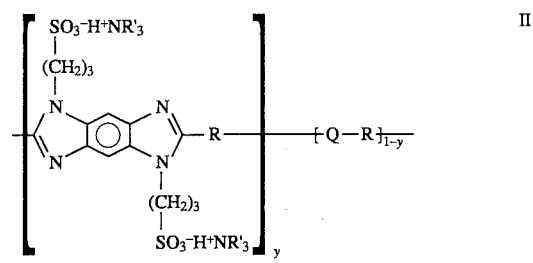

wherein x has a value of 0.0 to 1.00 and y has a value of 0.05 to 1.00; Q is a benzobisazole of the formula:

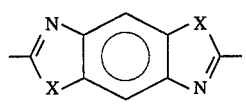

or

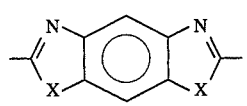

wherein X is —O— or —S—; R is selected from the group consisting of:

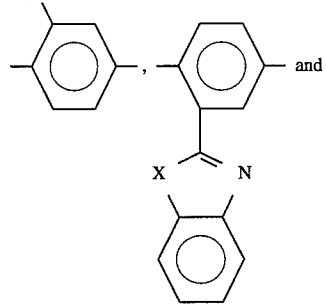

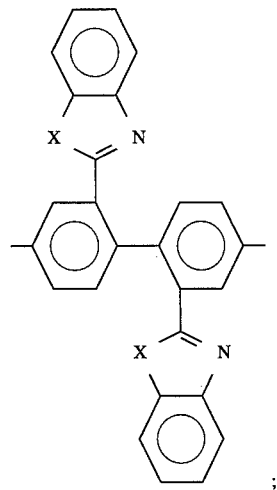

;

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups.

2. The polymer of claim 1 wherein the repeating units have the formula I, wherein x is 1.0 and R' is —$C_2H_5$.

3. The polymer of claim 1 wherein the repeating units have the formula I, wherein x is 1.0 and $NR'_3$ is N,N-dimethyl-4-nitroaniline.

4. An organic/inorganic hybrid material having transparency which comprises the sol-gel derived, hydrolytically condensed reaction product of (i) a metal alkoxide of the formula $M(OZ)_v$, wherein Z is a alkyl group, M is Si, Ti, Al or a mixture thereof, and v is the valence value of M, and (ii) a polymer having repeating units of the formulae:

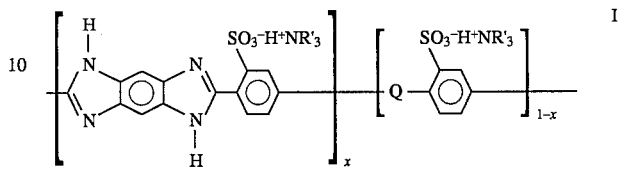

or

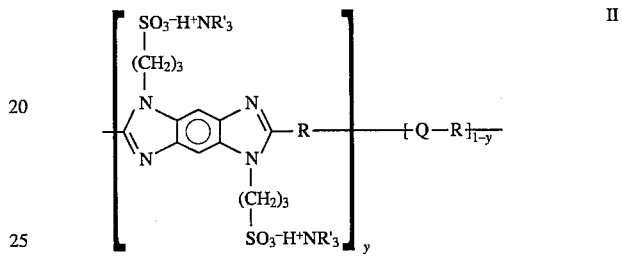

wherein x and y each has a value of 0.05 to 1.00; Q is a benzobisazole of the formula:

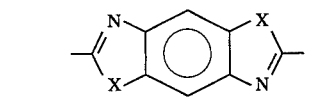

or

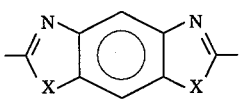

wherein X is —O— or —S—; R is selected from the group consisting of:

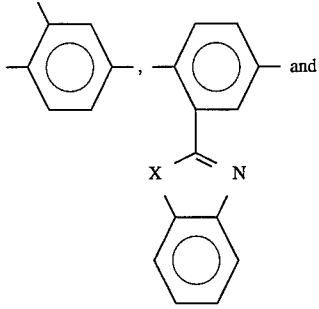

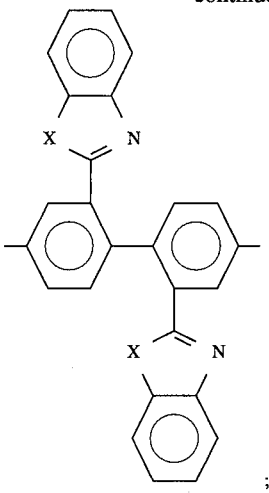

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups.

5. The hybrid material of claim 4 further comprising (iii) about 1 to 15 mol % of a silane coupling agent.

6. The hybrid material of claim 4 wherein said polymer has the formula I, wherein x is 1.0 and $NR'_3$ is N-(3-triethoxysilyl)-4,5-dihydroimidazole, and wherein said metal alkoxide is tetramethoxysilane.

7. The hybrid material of claim 5 wherein said polymer has the formula I, wherein x is 0.0, X is —S— and $NR'_3$ is tributylamine; wherein said metal alkoxide is tetramethoxysilane and said silane coupling agent is (N,N-diethyl-3-amino-propyl) trimethoxysilane.

* * * * *

UNITED STATES PATENT AND TRADEMARK OFFICE
CERTIFICATE OF CORRECTION

PATENT NO. : 5,508,376

DATED: : April 16, 1996

INVENTOR(S) : Dang et al.

It is certified that error appears in the above-identified patent and that said Letters Patent is hereby corrected as shown below:

At column 4, line 45, "genes:ally" should read "generally".

At column 5, line 14, "rigicl-rod" should read "rigid-rod".

Signed and Sealed this

Twenty-first Day of July, 1998

*Attest:*

BRUCE LEHMAN

*Attesting Officer*   *Commissioner of Patents and Trademarks*